United States Patent
Soto Macias

(10) Patent No.: US 12,523,287 B2
(45) Date of Patent: Jan. 13, 2026

(54) VEHICLE STEERING ASSEMBLY INCLUDING ANTI-LEAKAGE COUNTERMEASURE

(71) Applicant: Nissan North America, Inc., Franklin, TN (US)

(72) Inventor: Angel Eduardo Soto Macias, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 469 days.

(21) Appl. No.: 18/187,370

(22) Filed: Mar. 21, 2023

(65) Prior Publication Data

US 2024/0318716 A1  Sep. 26, 2024

(51) Int. Cl.
*F16H 57/04* (2010.01)
*B62D 3/12* (2006.01)
*B62D 5/00* (2006.01)

(52) U.S. Cl.
CPC ......... *F16H 57/0424* (2013.01); *B62D 5/008* (2013.01); *B62D 3/12* (2013.01)

(58) Field of Classification Search
CPC ........ F16H 57/0242; B62D 5/008; B62D 3/12
USPC ........................................ 180/400
See application file for complete search history.

(56) References Cited

U.S. PATENT DOCUMENTS

2004/0163881 A1   8/2004  Shiina et al.
2015/0362060 A1* 12/2015  Fukasawa ........... F16H 57/0424
                                                     184/6.12

FOREIGN PATENT DOCUMENTS

CN          107735599 A  *  2/2018  ........... F16H 57/042

* cited by examiner

*Primary Examiner* — Jacob D Knutson
(74) *Attorney, Agent, or Firm* — Young Basile Hanlon & MacFarlane, P.C.

(57) ABSTRACT

A steering assembly for a vehicle that includes: a first housing; a second housing that is connected to the first housing so as to define an internal chamber therebetween; and a gear that is located within the second housing. The second housing includes an anti-leakage countermeasure that is formed integrally therewith and which is configured to inhibit the leakage of a lubricant from the steering assembly.

20 Claims, 3 Drawing Sheets

VEHICLE STEERING ASSEMBLY INCLUDING ANTI-LEAKAGE COUNTERMEASURE

TECHNICAL FIELD

The present disclosure relates to (power) steering assemblies in vehicles and, more specifically, to steering assemblies that include a countermeasure against the leakage of lubricant.

BACKGROUND

Power steering assemblies include an array of components, some of which require lubrication. For example, known power steering assemblies often include a gear housing that accommodates one or more (reduction) gears, which assist in rotation of the vehicle's steering wheel. Over time, however, certain lubricants (e.g., grease) can release, degrade, and/or separate into a liquid (e.g., oil), which is more susceptible to leakage from the power steering assembly.

In order to maintain proper lubrication and operation and inhibit the leakage of lubricant, known power steering assemblies often include one or more sealing members (e.g., O-rings, gaskets, etc.). Such sealing members, however, are not only subject to wear and failure, but increase the complexity and maintenance of the power steering assembly.

The present disclosure addresses this concern and provides an anti-leakage countermeasure that inhibits (if not entirely prevents) the unintended outflow of lubricant from the power steering assembly and obviates the need for the aforementioned sealing member(s).

SUMMARY

In one aspect of the present disclosure, a steering assembly for a vehicle is disclosed that includes: a steering wheel; a steering column that is connected to the steering wheel; a shaft that is connected to the steering column; and a steering rack that is connected to the shaft. The steering column includes: a sensor housing; a gear housing that is connected to the sensor housing so as to define an internal chamber therebetween; and a reduction gear that is located within the internal chamber. The gear housing includes an outer wall defining a recirculation channel in communication with the internal chamber such that, upon reaching a threshold level, a lubricant enters the recirculation channel to thereby inhibit leakage of the lubricant from the steering assembly.

In certain embodiments, the recirculation channel may be configured to direct the lubricant therethrough via capillary action.

In certain embodiments, the recirculation channel may include a first end that defines an outlet from the internal chamber and a second end that defines an inlet into the internal chamber.

In certain embodiments, the second end of the recirculation channel may be located vertically below the first end of the recirculation channel.

In certain embodiments, the recirculation channel may further include a valve that is positioned between the first end and the second end.

In certain embodiments, the valve may be configured to inhibit backflow of the lubricant into the internal chamber through the outlet.

In certain embodiments, the recirculation channel may define a non-uniform transverse cross-sectional configuration between the first end and the second end.

In certain embodiments, the recirculation channel may include a first channel portion that is in communication with the outlet and a second channel portion that is in communication with the inlet.

In certain embodiments, the first channel portion may define a first transverse cross-sectional dimension, and the second channel portion may define a second transverse cross-sectional dimension that is less than the first transverse cross-sectional dimension.

In certain embodiments, the first channel portion and the second channel portion may extend in generally orthogonal relation.

In certain embodiments, the recirculation channel may further include a capillary column that is configured to receive the lubricant from the first channel portion to thereby increase the capillary action within the recirculation channel and facilitate return of the lubricant to the internal chamber via the second channel portion.

In certain embodiments, the second channel portion and the capillary column may extend in generally parallel relation.

In another aspect of the present disclosure, a steering assembly for a vehicle is disclosed that includes: a first housing; a second housing that is connected to the first housing so as to define an internal chamber therebetween; and a gear that is located within the internal chamber. The second housing includes an anti-leakage countermeasure that is formed integrally therewith and which is configured to inhibit the leakage of a lubricant from the steering assembly.

In certain embodiments, the anti-leakage countermeasure may include a recirculation channel that is formed in an outer wall of the second housing.

In certain embodiments, the recirculation channel may define a non-uniform transverse cross-sectional configuration.

In certain embodiments, the recirculation channel may include a first channel portion and a second channel portion.

In certain embodiments, the first channel portion may define an outlet from the internal chamber such that the lubricant exits the internal chamber and enters the recirculation channel via the outlet.

In certain embodiments, the second channel portion may define an inlet into the internal chamber such that the lubricant exits the recirculation channel and enters the internal chamber via the inlet.

In certain embodiments, the first channel portion may define a first transverse cross-sectional dimension, and the second channel portion may define a second transverse cross-sectional dimension that is less than the first transverse cross-sectional dimension in order to direct flow of the lubricant through the steering assembly via capillary action.

In certain embodiments, the first channel portion and the second channel portion may extend in generally orthogonal relation.

In certain embodiments, the recirculation channel may further include a capillary column that is in communication with the first channel portion such that the lubricant flows from the first channel portion into the capillary column to thereby increase the capillary action within the recirculation channel and facilitate return of the lubricant to the internal chamber via the second channel portion.

In certain embodiments, the second channel portion and the capillary column may extend in generally parallel relation.

In another aspect of the present disclosure, a steering assembly for a vehicle is disclosed that includes: a first housing; a second housing that is connected to the first housing so as to define an internal chamber therebetween; and a gear that is located within the internal chamber. The second housing includes a recirculation channel that is formed in an outer wall thereof and which is configured to direct a lubricant through the steering assembly via capillary action.

In certain embodiments, the recirculation channel may include: a first channel portion that defines a first transverse cross-sectional dimension; a second channel portion that defines a second transverse cross-sectional dimension which is less than the first transverse cross-sectional dimension; and a capillary column that is configured to receive the lubricant from the first channel portion to thereby increase the capillary action within second channel portion and facilitate flow of the lubricant through the steering assembly.

In certain embodiments, the first channel portion and the second channel portion may extend in generally orthogonal relation.

In certain embodiments, the second channel portion and the capillary column may extend in generally parallel relation.

BRIEF DESCRIPTION OF THE DRAWINGS

According to common practice, the various features of the drawings may not be to scale and may be arbitrarily expanded or reduced for clarity.

DETAILED DESCRIPTION

The present disclosure describes a (power) steering assembly for a vehicle that includes a (first) sensor housing and a (second) gear housing, which are connected together so as to define an internal chamber therebetween that houses (receives, accommodates) one or more (reduction) gears, as well as an anti-leakage countermeasure, which is configured to inhibit the leakage of lubricant from the steering assembly. The anti-leakage countermeasure includes a recirculation channel that is integrally formed in an outer wall of the gear housing and which is configured to direct the flow of lubricant therethrough via capillary action.

Figure 1:
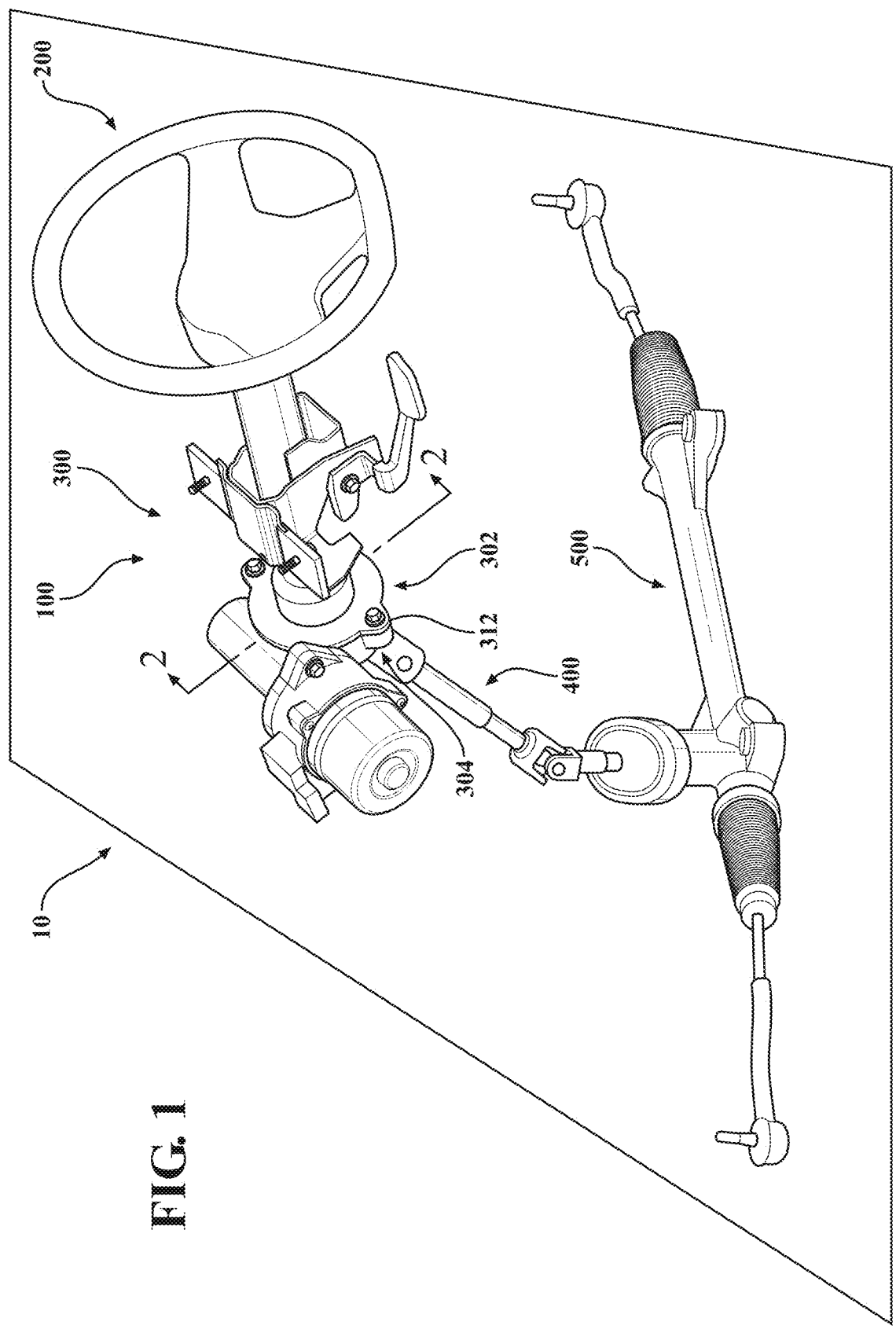
FIG. 1 is a top, perspective view of a steering assembly in a vehicle according to the principles of the present disclosure.
Figure 2:
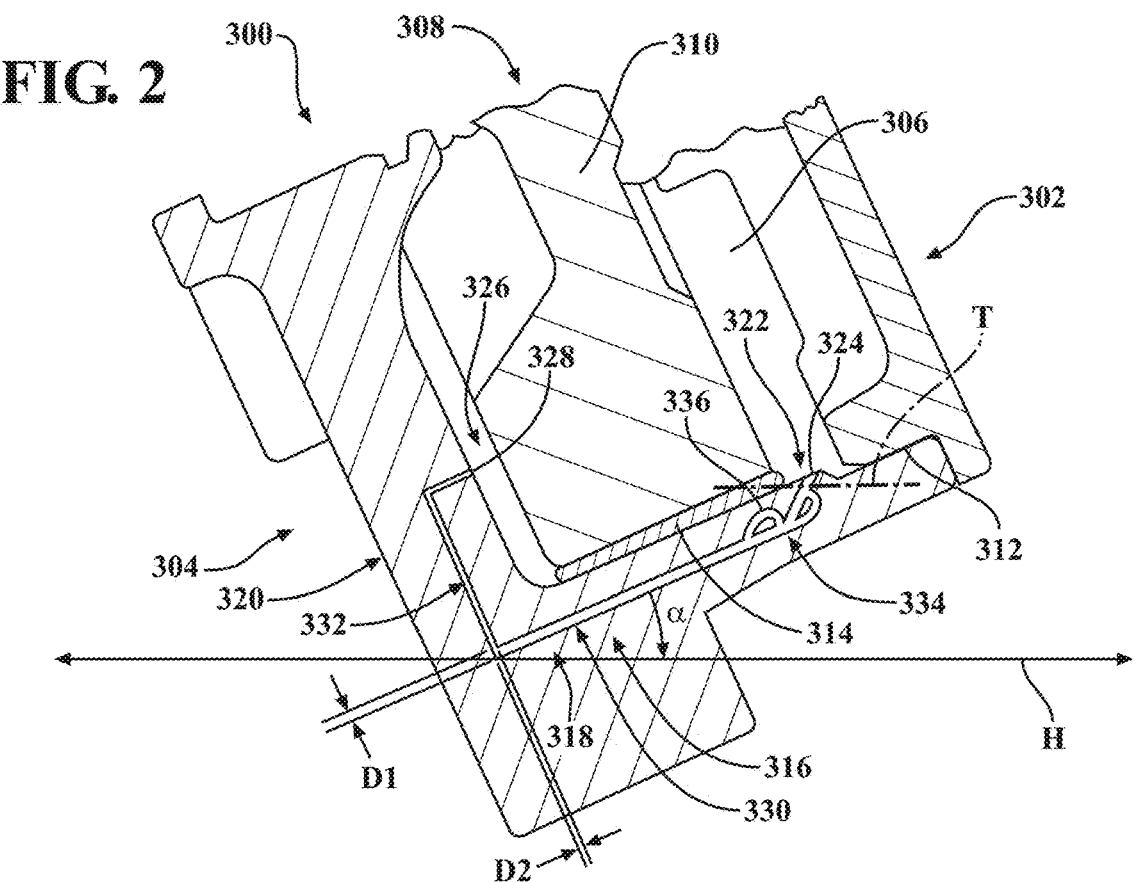
FIG. 2 is a cross-sectional view taken along line 2-2 in FIG. 1 illustrating one embodiment of an anti-leakage countermeasure with the steering assembly shown during typical operating conditions.
Figure 3:
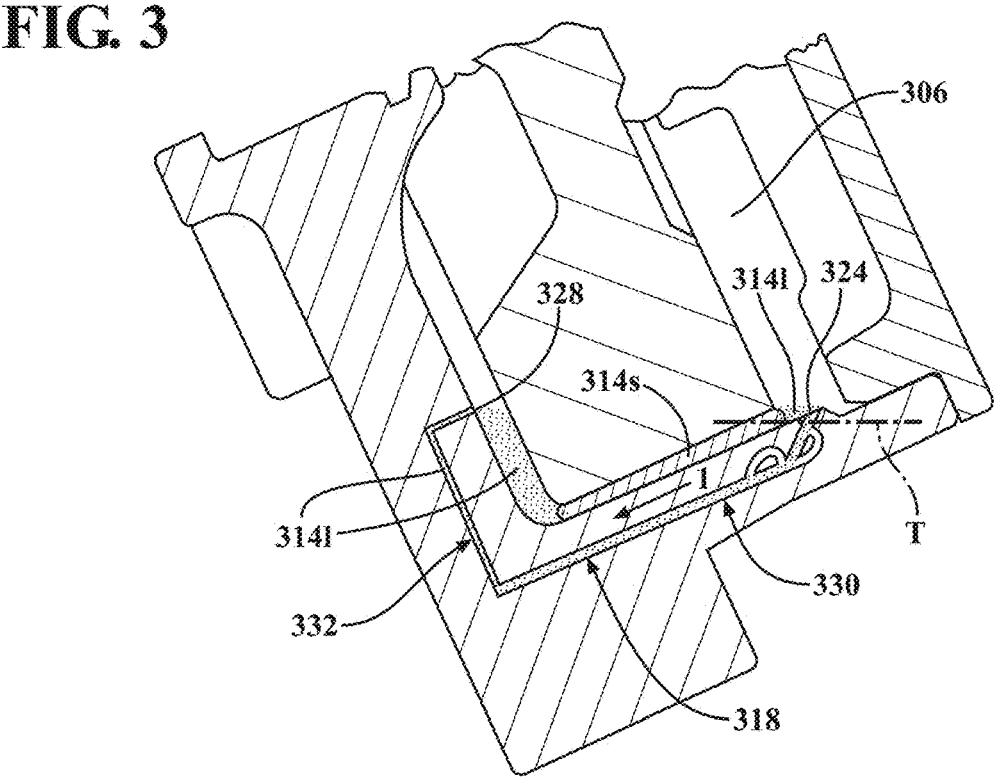
FIG. 3 is a cross-sectional view taken along line 2-2 in FIG. 1 with the steering assembly shown during atypical operating conditions.

With reference to FIGS. 1-3, a vehicle 10 is illustrated that includes a (power) steering assembly 100. While the vehicle 10 is generally illustrated and described as a passenger vehicle throughout the present disclosure, it should be appreciated that principles and the components described herein below may find applicability to wide variety of vehicles including, for example, trucks, SUVs, vans, etc.

The steering assembly 100 includes: a steering wheel 200; a steering column 300 that is connected to the steering wheel 200; a shaft 400 that is connected to the steering column 300; and a steering rack 500 that is connected to the shaft 400, whereby rotational force is transmitted from the steering wheel 200 to the steering rack 500 to thereby steer the vehicle 10. The steering column 300 includes a (first) sensor housing 302, which accommodates (receives, houses) one or more sensors (e.g., one or more torque sensors) (not shown), and a (second) gear housing 304, which is connected to the sensor housing 302 so as to define an internal chamber 306 therebetween that accommodates (receives, houses) one or more gears 308 (e.g., a reduction gear 310) such that the gear(s) 308 are located within the internal chamber 306. The sensor housing 302 and the gear housing 304 are (directly, mechanically) connected at an interface 312, which creates a potential leakage condition (e.g., at or along the interface 312) in which there is an unintended outflow of a lubricant 314 from the steering assembly 100.

In order to offset the potential leakage condition, the steering assembly 100 includes an anti-leakage countermeasure 316 that inhibits (if not entirely prevents) escape of the lubricant 314, thereby maintaining proper lubrication and operation of the steering assembly 100, as described in further detail below. More specifically, the anti-leakage countermeasure 316 includes a recirculation channel 318 that is defined by (formed in) an outer wall 320 of the gear housing 304, whereby the anti-leakage countermeasure 316 is integrally formed therewith (e.g., via casting) and creates additional available volume for the lubricant 314 (beyond that defined by the internal chamber 306).

The recirculation channel 318 is in communication with the internal chamber 306 and includes a first end 322, which defines an outlet 324 from the internal chamber 306, and a second end 326, which defines an inlet 328 into the internal chamber 306 and is located (vertically) below the first end 322. Under typical (normal) operating conditions (FIG. 2), the lubricant 314 is solid and remains housed within the internal chamber 306 so as to lubricate the gear(s) 308. Under atypical (abnormal) operating conditions (FIG. 3), however, the lubricant 314 separates into a solid lubricant 314s (e.g., grease) and a liquid lubricant 314l (e.g., oil). Upon reaching a threshold level T, the liquid lubricant 314l exits the internal chamber 306 via the outlet 324, enters and circulates through the recirculation channel 318, and exits the recirculation channel 318 through the inlet 328 such that the liquid lubricant 314l is returned to the internal chamber 306. The anti-leakage countermeasure 316 thus recirculates and directs the liquid lubricant 314l through the steering assembly 100, thereby inhibiting (if not entirely preventing) leakage of the liquid lubricant 314l that might otherwise occur at (or along) the interface 312 (e.g., between the sensor housing 302 and the gear housing 304).

The recirculation channel 318 is configured to direct the flow of the liquid lubricant 314l therethrough (and through the steering assembly 100) via capillary action, which is facilitated by the inclusion of a non-uniform transverse cross-sectional configuration between the ends 322, 326 thereof. More specifically, the recirculation channel 318 includes a first channel portion 330, which is in communication with the outlet 324 and defines a first transverse cross-sectional dimension D1, and a second channel portion 332, which is in communication with the inlet 328 and defines a second transverse cross-sectional dimension D2 that is less than the first transverse cross-sectional dimension D1. The relative dimensioning between the channel portions 330, 332 creates a suction effect that draws the liquid lubricant 3141 through the recirculation channel 318 and facilitates flow of the liquid lubricant 3141 through the steering assembly 100 to thereby return the liquid lubricant 3141 to the internal chamber 306, leaving the recirculation channel 318 (generally) empty. The capillary action achieved by the recirculation channel 318 thus obviates any need for pumps or other such (external) mechanical devices, thereby simplifying both assembly and operation of the steering assembly 100.

In the illustrated embodiment, the channel portions 330, 332 are configured such that they extend in (generally) orthogonal relation. Depending upon the particular configuration of the steering assembly 100 (e.g., the configuration of the gear housing 304, the specific location and/or the specific number of gears 308, etc.), however, it is envisioned that the relative orientations of the channel portions 330, 332 may be varied. Additionally, as seen in FIG. 2, the steering assembly 100 is configured such that the channel portion 330 extends at an angle α in relation to the horizontal H that lies (substantially) with the range of (approximately) 30° to (approximately) 60°. However, embodiments in which the steering assembly 100 may be configured such that the angle α lies outside the disclosed range are also envisioned herein (e.g., depending upon the particular configuration of the vehicle 10, the particular configuration of the steering assembly 100, etc.). For example, an embodiment in which the angle α may be (approximately) 0° would not be beyond the scope of the present disclosure.

In order to inhibit backflow of the liquid lubricant 3141 into the internal chamber 306 through the outlet 324, the recirculation channel 318 includes a valve 334 that is positioned between the ends 322, 326 thereof. For example, in the illustrated embodiment, the valve 334 is configured as a Tesla valve 336. It should be appreciated, however, that the particular configuration of the valve 334 may be altered in various embodiments without departing from the scope of the present disclosure. For example, it is envisioned that the valve 334 may be configured as a check valve, a ball valve, or any other such member or mechanism suitable for the intended purpose of inhibiting backflow of the liquid lubricant 3141 into the internal chamber 306 through the outlet 324.

During use and operation of the steering assembly 100, under typical operating conditions (FIG. 2), in which the lubricant 314 is (generally) solid and below the threshold level T, the anti-leakage countermeasure 316 is non-functional, and the recirculation channel 318 is (generally) empty. Under atypical operating conditions (FIG. 3), however, as the lubricant 314 separates into the solid lubricant 314s and the liquid lubricant 3141, the liquid lubricant 3141 rises above the threshold level T exits the internal chamber 306 via the outlet 324, which is positioned at or (vertically) below the threshold level T, and enters the recirculation channel 318, filling the first channel portion 330. Via the aforedescribed capillary action, the liquid lubricant 3141 is drawn into the second channel portion 332 (in the direction identified by arrow 1) and re-enters the internal chamber 306 via the inlet 328, thereby inhibiting (if not entirely preventing) leakage of the liquid lubricant 3141 from the steering assembly 100 and allowing for reabsorption of the liquid lubricant 3141 by the solid lubricant 314s, so as to maintain proper lubrication and operation of the steering assembly 100.

Figure 4:
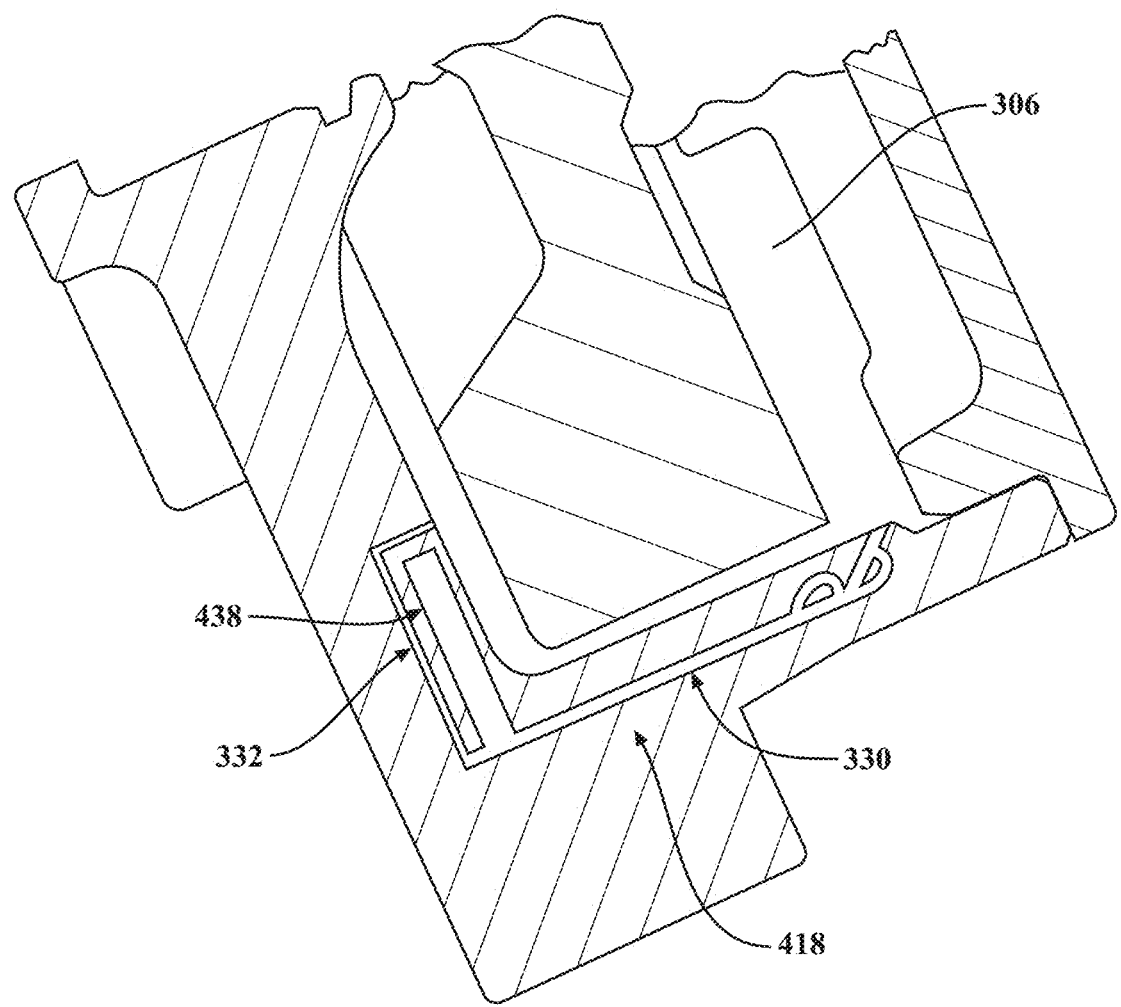
FIG. 4 is a cross-sectional view of the steering assembly seen in FIG. 1 and illustrating another embodiment of the anti-leakage countermeasure.

With reference now to FIG. 4, another embodiment of the recirculation channel will be discussed, which is identified by the reference character 418. The recirculation channel 418 is substantially similar in both structure and function to the aforedescribed recirculation channel 318 (FIGS. 1-3) and, accordingly, will only be discussed with respect to differences therefrom in the interest of brevity. As such, identical reference characters will be utilized to refer to elements, structures, features, etc., common to the recirculation channels 318, 418.

In addition to the first channel portion 330 and the second channel portion 332, the recirculation channel 418 includes a capillary column 438. The capillary column 438 is in communication with, and is configured to receive the liquid lubricant 3141 (FIGS. 2, 3) from, the first channel portion 330 such that the liquid lubricant 3141 flows from the first channel portion 330 into the capillary column 438. As seen in FIG. 4, the recirculation channel 418 is configured such that the first channel portion 330 and the capillary column 438 extend in (generally) orthogonal relation and such that the second channel portion 332 and the capillary column 438 extend in (generally) parallel relation.

The capillary column 438 accommodates an additional volume of the liquid lubricant 3141, which results in a proportionate increase in pressure and suction within the recirculation channel 418 as the capillary column 438 fills, thereby increasing (enhancing, augmenting) the aforedescribed capillary action. The increased capillary action facilitated by the capillary column 438 further facilitates recirculation of the liquid lubricant 3141 through the steering assembly 100 and, thus, return of the liquid lubricant 3141 to the internal chamber 306 via the second channel portion 332.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 182°±25% (e.g., an angle that lies within the range of (approximately) 135° to (approximately) 225°) and the term "generally orthogonal" should be understood as referring to configurations in with the pertinent components are oriented so as to define an angle therebetween that is equal to 90°±25% (e.g., an angle that lies within the range of (approximately) 67.5° to (approximately)) 112.5°. The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A steering assembly for a vehicle, the steering assembly comprising:
   a steering wheel;
   a steering column connected to the steering wheel, the steering column including:
     a sensor housing;
     a gear housing connected to the sensor housing so as to define an internal chamber therebetween; and
     a reduction gear located within the internal chamber, wherein the gear housing includes an outer wall defining a recirculation channel in communication with the internal chamber such that, upon reaching a threshold level, a lubricant enters the recirculation channel to thereby inhibit leakage of the lubricant from the steering assembly;
   a shaft connected to the steering column; and
   a steering rack connected to the shaft.

2. The steering assembly of claim 1, wherein the recirculation channel is configured to direct the lubricant therethrough via capillary action.

3. The steering assembly of claim 2, wherein the recirculation channel includes a first end defining an outlet from the internal chamber and a second end defining an inlet into the internal chamber.

4. The steering assembly of claim 3, wherein the second end of the recirculation channel is located vertically below the first end of the recirculation channel.

5. The steering assembly of claim 3, wherein the recirculation channel further includes a valve positioned between the first end and the second end, the valve configured to inhibit backflow of the lubricant into the internal chamber through the outlet.

6. The steering assembly of claim 3, wherein the recirculation channel includes a non-uniform transverse cross-sectional configuration between the first end and the second end.

7. The steering assembly of claim 6, wherein the recirculation channel includes a first channel portion in communication with the outlet and a second channel portion in communication with the inlet, the first channel portion defining a first transverse cross-sectional dimension, and the second channel portion defining a second transverse cross-sectional dimension less than the first transverse cross-sectional dimension.

8. The steering assembly of claim 7, wherein the first channel portion and the second channel portion extend in generally orthogonal relation.

9. The steering assembly of claim 7, wherein the recirculation channel further includes a capillary column configured to receive the lubricant from the first channel portion to thereby increase the capillary action within the recirculation channel and facilitate return of the lubricant to the internal chamber via the second channel portion.

10. The steering assembly of claim 9, wherein the second channel portion and the capillary column extend in generally parallel relation.

11. A steering assembly for a vehicle, the steering assembly comprising:
    a first housing;
    a second housing connected to the first housing so as to define an internal chamber therebetween, the second housing including an anti-leakage countermeasure formed integrally therewith and configured to inhibit leakage of a lubricant from the steering assembly; and
    a gear located within the internal chamber.

12. The steering assembly of claim 11, wherein the anti-leakage countermeasure includes a recirculation channel formed in an outer wall of the second housing.

13. The steering assembly of claim 12, wherein the recirculation channel includes a non-uniform transverse cross-sectional configuration.

14. The steering assembly of claim 13, wherein the recirculation channel includes:
    a first channel portion defining an outlet from the internal chamber such that the lubricant exits the internal chamber and enters the recirculation channel via the outlet, the first channel portion defining a first transverse cross-sectional dimension; and
    a second channel portion defining an inlet into the internal chamber such that the lubricant exits the recirculation channel and enters the internal chamber via the inlet, the second channel portion defining a second transverse cross-sectional dimension less than the first transverse cross-sectional dimension in order to direct flow of the lubricant through the steering assembly via capillary action.

15. The steering assembly of claim 14, wherein the first channel portion and the second channel portion extend in generally orthogonal relation.

16. The steering assembly of claim 14, wherein the recirculation channel further includes a capillary column in communication with the first channel portion such that the lubricant flows from the first channel portion into the capillary column to thereby increase the capillary action within the recirculation channel and facilitate return of the lubricant to the internal chamber via the second channel portion.

17. The steering assembly of claim 16, wherein the second channel portion and the capillary column extend in generally parallel relation.

18. A steering assembly for a vehicle, the steering assembly comprising:
   a first housing;
   a second housing connected to the first housing so as to define an internal chamber therebetween, the second housing including a recirculation channel formed in an outer wall thereof configured to direct a lubricant through the steering assembly via capillary action; and
   a gear located within the internal chamber.

19. The steering assembly of claim 18, wherein the recirculation channel includes:
   a first channel portion defining a first transverse cross-sectional dimension;
   a second channel portion defining a second transverse cross-sectional dimension less than the first transverse cross-sectional dimension; and
   a capillary column configured to receive the lubricant from the first channel portion to thereby increase the capillary action within second channel portion and facilitate flow of the lubricant through the steering assembly.

20. The steering assembly of claim 19, wherein the first channel portion and the second channel portion extend in generally orthogonal relation, and the second channel portion and the capillary column extend in generally parallel relation.

* * * * *